June 26, 1934.  R. A. BORAH  1,964,424
AUTOMOBILE SEAT
Filed Oct. 3, 1933
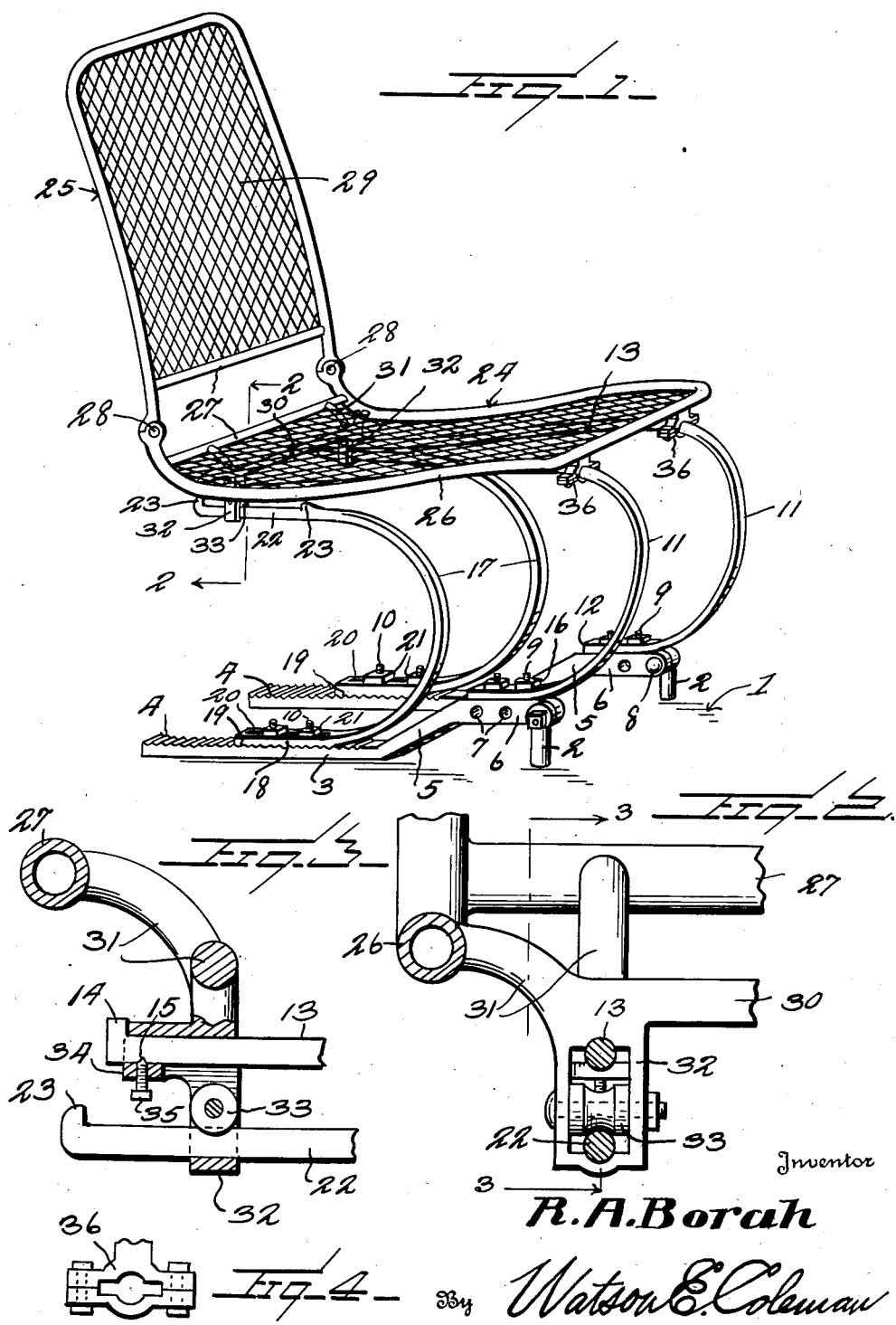

Patented June 26, 1934

1,964,424

UNITED STATES PATENT OFFICE 1,964,424

AUTOMOBILE SEAT

Ralph A. Borah, Raymond, S. Dak.

Application October 3, 1933, Serial No. 691,991

8 Claims. (Cl. 155—50)

This invention relates to improvements in seat structures and pertains particularly to an improved automobile seat.

The primary object of the present invention is to provide a seat which is so designed that the occupant will remain comfortable therein even though required to use the same steadily over a long period of time.

Another object of the invention is to provide a motor vehicle seat structure having an open back and seat frame covered with an open mesh material such, for example, as woven fibre such as cane or the like, whereby the free circulation of air through the seat and back will assist in keeping the occupant comfortable.

Another object of the invention is to provide a motor vehicle seat having a novel resilient supporting means whereby the seat will have a certain amount of free vertical movement and the supporting means will absorb the shocks received by the motor vehicle and prevent the occupant from receiving the same.

Still another object of the invention is to provide a novel seat structure having novel means for coupling resilient or yieldable supporting elements therewith and for mounting the same upon the supporting floor whereby adjustment of the seat relative to adjacent fixed elements may be readily accomplished.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in perspective of the seat structure embodying the present invention;

Figure 2 is a sectional view on the line 2—2 of Figure 1;

Figure 3 is a sectional view on the line 3—3 of Figure 2.

Figure 4 is a detail view of the guide 36, showing the same on an enlarged scale.

Referring now more particularly to the drawing wherein like numerals of reference indicate corresponding parts throughout the several views, the numeral 1 indicates a portion of a floor structure such, for example, as the floor of a motor vehicle upon which the seat is to be mounted. Also mounted upon this floor are the two posts 2 to which the seat structure is secured. Disposed upon the floor adjacent each of the posts 2 is a bar 3, the top surface of which is provided through a portion of its length extending from one end, with the transversely directed teeth 4. Adjacent the opposite end from which the teeth 4 extend the bar has an off-set portion 5 which lifts the opposite end portion 6 free from the underlying floor 1 when the bar is mounted thereon. These bars 3 are disposed in spaced parallel relation with the raised portions 6 thereof adjacent a post 2 and these raised portions are provided with a series of apertures 7 which are designed to receive the lateral pin 8 carried by the upper end of the adjacent post 2. By this means the bars 3 are firmly secured against movement on the car floor.

The forward raised portion of each bar 3 is provided with a pair of upwardly extending threaded bolts 9 and substantially midway of the toothed area 4 of each bar there is a similar pair of upwardly extending threaded bolts which are indicated by the numeral 10.

Mounted upon the forward raised portion 6 of each of the bars 3 is a front forwardly bowed seat supporting leg 11, one end of which is formed to provide a foot 12 which is provided with a pair of apertures designed to receive the bolts 9 when the foot is mounted upon the portion 6 of the bar. The upper end of each of these legs is extended rearwardly into the relatively long arm 13 which terminates in the upwardly turned tip 14 and in its under side adjacent this tip is provided with a notch or recess 15. These arms 13 extend rearwardly beneath the seat of the chair as will be hereinafter more fully described, in parallel relation and the feet 12 are secured to the supporting bars by means of the nuts 16 which are threaded onto the bolts 9.

Rearwardly of the spring legs 11 are similarly formed arcuate spring legs 17. Each of these legs 17 has a relatively long straight foot portion 18 at one end which is transversely toothed or serrated as indicated at 19 to engage in the teeth 4 of the bar 3 upon which the foot rests and the central part of each foot 18 is provided with a longitudinally extending slot 20 through which the bolts 10 extend, the feet being secured to the base bar by threading holding nuts 21 upon these bolts.

The upper ends of the arcuate spring legs 17 are extended to form the rearwardly directed arm portions 22 which are provided with the spaced raised portions or stops 23 upon their upper sides, for the purpose about to be described. The arms 13 of the front spring legs are materially longer than the arms 22 of the rear spring legs so that the ends of these four arms are disposed in substantially the same area extending transversely of the chair structure.

The chair seat and back are indicated respectively by the numerals 24 and 25 and each comprises a substantially U-shaped tubular steel frame 26 which adjacent the ends of the side portions are provided with the cross brace bars 27 and at the ends these portions are formed to provide hinge units which when secured together form the hinge connection 28 between these parts of the structure. These hinge units are so designed that while the back will be held rigidly in the proper upright position it may, if it is desired, be folded forwardly and downwardly onto the seat. For the purpose of making the seat structure more comfortable the seat proper and the back are slightly longitudinally arched in the manner illustrated.

Both the seat and back frames 24 and 25 are covered with a suitable open mesh material 29 such, for example, as woven cane or other fibrous material so that air may circulate freely therethrough and thus prevent the excessive perspiration of the occupant which is produced by plush or other closely woven seat coverings.

Extending transversely of the seat portion 24 adjacent the rear thereof is a brace bar 30 which is joined to the side members of the seat frame and to the cross member 27 thereof, by the end arms 31.

At each end of this brace bar 30 is formed the depending frame 32 which has its open sides directed toward the front and rear of the seat. Pivotally mounted in the lower part of this frame 32 is the roller 33 between which and the bottom cross bar of the frame extends the portion of the arm 22 of a rear spring leg which lies between the stops 23. These stops by engaging the roller 33 serve to limit the movement of the arm portion of the leg when the seat is in use.

Extending across the frame above the roller 33 is a bar from which projects the cradle 34 and passing through the frame and disposed in this cradle is the arm portion 13 of a front spring leg 11. Each of these cradles has a set screw 35 passing upwardly therethrough to engage in the notch 15 of the arm 13 disposed therein. By loosening the set screw 35 the arm may be removed from connection with the frame 32.

These arms 13 of the front spring legs 11 extend the full length of the under side of the seat frame 24 and pass through the guide eyes 36 which are secured to the under side of the front cross portion of the seat frame in the manner illustrated. These guide eyes may be formed in two pieces as illustrated so as to facilitate the easy application and removal of the arms 13.

From the foregoing it will be readily apparent that when a person is resting upon the seat structure the four spring legs will be bent or flexed and while the arms of the front spring legs will not have movement relative to the seat frame, the arms 22 of the rear spring legs will have such movement and will move across the rollers 33 in the frames 32 through which they pass. With this construction it will be readily apparent that a comfortable resiliently supported seat is provided and if adjustment of the same is necessary, when the seat is used in a motor vehicle, so that the occupant may more conveniently reach the controls of the machine, the posts 2 may be disconnected from the base bars 3 so that the latter may be moved forwardly or rearwardly as desired to effect the desired disposition of the seat.

In addition to the foregoing adjustment, adjustment of the seat structure may also be made according to the weight of the person to occupy the same. If the occupant of the seat is of a heavy build the rear spring legs 17 will be moved back away from the leg 11 so that the normal position of the seat will be with the rollers 33 disposed on the arms 22 adjacent the inner stops 23. If the person who is to occupy the seat is lightly built then the legs 17 will be shifted forwardly so that the rollers 33 will be located near the stops at the outer ends of the arms 22.

In Figure 4 there is shown an enlarged view of the eye 36 from which it will be apparent that it is designed for the reception of a body of circular cross section such as the upper ends of the front spring legs 11 or for a body of rectangular cross section such as would be had if the spring legs were made throughout of the flat spring metal such as is illustrated for the portions 11 and 12 of these legs. Where the upper ends or arms 13 are circular in cross section in the manner illustrated they will then occupy the central parts of the eyes but if these arms are preferred in the flat form they will then occupy the openings at the sides of the central portion of the eye as will be readily understood.

From the foregoing description it will be readily apparent that where a motor vehicle is equipped with a seat structure of the character herein described ready adjustment of the seat may be made to accommodate the same to drivers of different heights and weight, for, in addition to the adjustments previously described, which may be made in accordance with the weight of the person to occupy the seat, it will be readily apparent that by changing the point of connection of the posts 2 with the forward ends of the bars 3, the seat may be properly placed in the car in accordance with the leg length or reach of the person to occupy the same. Because of the fact that the seat and back move together on the resilient supporting legs another desirable feature of the present invention resides in the fact that the back of the occupant will not be rubbed as would be the case if he were occupying a usual type of seat wherein the back is stationary and the seat proper yields or moves relative thereto.

Having thus described the invention, what is claimed is:—

1. A seat structure comprising a bottom, a back attached thereto, and forward and rearward pairs of bowed resilient supporting legs connected with said bottom, one pair of said legs being adjustable relative to the other pair for the accommodation of bodies of different weights and said legs having the bows extending all in the same direction.

2. A seat structure comprising a bottom, a back attached thereto, a pair of bowed front legs each connected at one end with the seat bottom, means for securing the other ends of said legs to a supporting floor, a second pair of bowed legs disposed rearwardly of the first legs, means for securing each of said second legs at one end to the said floor structure for adjustment relative to the first legs, and means for forming a loose connection between the upper ends of the second legs and the under side of said seat bottom.

3. A seat structure, comprising a seat bottom, a pair of bowed front legs each joined at one end to the under side of the seat bottom at the front thereof, means for securing the other ends of said legs to a supporting structure, arms forming continuations of the upper ends of said legs and extending to and secured to the rear of the seat bottom, a second pair of bowed legs disposed behind said first legs, means for adjustably securing the lower ends of the second legs to a supporting structure for adjustment relative to the first legs, arms extending from the upper ends of the second mentioned legs, and means for establishing a sliding connection between the last mentioned arms and the seat bottom, said legs being formed of resilient material.

4. A seat structure comprising a seat bottom, a back connected with the bottom, a pair of base bars disposed in parallel relation beneath said bottom, a pair of bowed front legs each secured at one end to a base bar and having its other end secured to the seat bottom, a pair of bowed rear legs disposed behind said front legs, means for adjustably securing the lower ends of the second pair of legs to said base bars for adjustment longitudinally thereon, and means forming a sliding connection between the upper ends of the second pair of legs and the rear of the seat bottom.

5. A seat structure comprising a seat bottom, a back connected with the bottom, a pair of base bars disposed in parallel relation beneath said bottom, a pair of bowed front legs each secured at one end to a base bar and having its other end secured to the seat bottom, a pair of bowed rear legs disposed behind said front legs, means for adjustably securing the lower ends of the second pair of legs to said base bars for adjustment longitudinally thereon, means forming a sliding connection between the upper ends of the second pair of legs and the rear of the seat bottom, said base bars being off-set through a portion of their length at the end with which the front legs are connected, anchoring posts designed to be mounted upon a supporting floor structure, and means for coupling the raised ends of said base bars with said posts.

6. A seat structure, comprising a seat bottom in the form of a frame having fabric therein, a back connected with the seat bottom, a bar member disposed transversely of the seat adjacent the rear thereof and connected at its ends to the sides of the frame, a pair of bowed leg members each secured at its lower end to an underlying supporting body, means securing the upper ends of said legs to the forward part of the seat bottom, a pair of rear bowed leg members disposed behind said first members, said second pair of leg members being secured to said supporting structure, a guide frame carried by said bar at each end, an arm extending rearwardly from the upper end of each of the first leg members and passing through and secured to an adjacent guide frame, and an arm extending rearwardly from the upper end of each of the second mentioned pair of legs and passing through an adjacent guide frame and slidably disposed therein.

7. A seat structure, comprising a seat bottom having a back connected therewith, a pair of bowed leg members each designed to rest at its lower end upon an underlying supporting body, means securing the upper ends of said legs to the forward part of the seat bottom, a pair of rear bowed leg members disposed behind said first members and having their bows extending in the same direction as the first legs, said second pair of leg members being designed to have their lower ends rest upon said supporting body, a guide frame depending from the underside of the seat bottom adjacent the rear and at each side thereof, an arm extending rearwardly from the upper end of each of the first leg members and passing through and secured to an adjacent guide frame, an arm extending rearwardly from the upper end of each of the second mentioned pair of leg members and passing through an adjacent guide frame and slidably disposed therein whereby the rear of the seat has relative movement to the rear leg when the front legs are flexed, and means for securing all of said leg members to said underlying supporting body in upright position.

8. A seat, comprising a bottom, a frame upon the underside of the bottom at the rear and adjacent each side thereof, each frame being formed to provide two guides, a pair of bowed resilient legs each having an elongated end portion, said legs each being disposed with its elongated end portion extending beneath said bottom from the front to the rear thereof and passing through a guide of a frame, means securing each of said leg end portions in its guide, a second pair of bowed resilient legs disposed behind the first pair with the bows extending in the same direction as the first legs and each having an elongated end portion slidably extending through a frame guide, and each of said legs having its other end formed to provide a foot portion, means securing said foot portions and maintaining the legs in upright position.

RALPH A. BORAH.